Patented Nov. 3, 1953

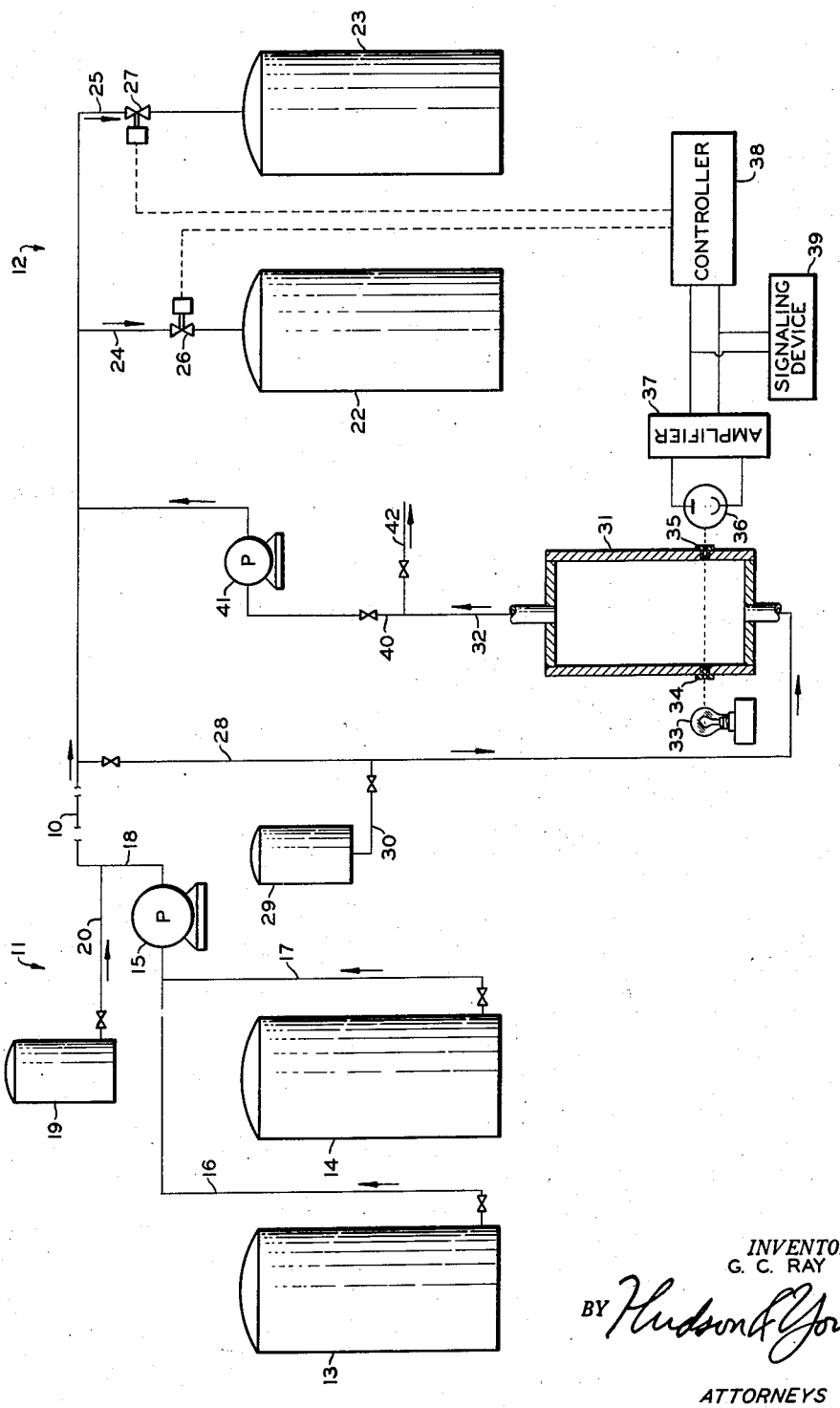

2,657,700

UNITED STATES PATENT OFFICE 2,657,700

METHOD OF AND APPARATUS FOR SEGREGATING FLUIDS TRANSPORTED BY A PIPELINE

Gardner C. Ray, Bartlesville, Okla., assignor to Phillips Petroleum Company, a corporation of Delaware Application November 14, 1949, Serial No. 126,992

11 Claims. (Cl. 137—93)

This invention relates to a method of segregating fluids transported by a pipeline and to apparatus for carrying out such method.

Heretofore, when different fluids were transported by a pipeline, a volume of the first fluid was introduced for a preselected time to the pipeline inlet and, thereafter, a volume of a second fluid was introduced. As a result, at the outlet of the pipeline, the first fluid was discharged until the bulk of it was received at the discharge station. Thereupon a relatively small volume of a mixture of both fluids appeared at the outlet, this mixture becoming progressively richer in the second fluid until, finally, only the second fluid was discharged from the pipeline. Normally, of course, the two fluids were segregated and passed to different storage tanks or to different distribution systems. This necessitated the determination of the time at which the second fluid began to appear at the outlet of the pipeline. In the past, this has been done by continuous or intermittent examination of the physical properties of the liquid passing from the pipeline outlet. Such determinations require a skilled technician, since the tests must be carried out rapidly and accurately in order that no excessive contamination of the first fluid by the second fluid shall occur.

In accordance with my invention, the presence of the second liquid is automatically detected at the pipeline outlet in a continuous or intermittent manner, as desired. The automatic method of my invention enables the services of a technician at the pipeline outlet to be dispensed with and, in fact, when practicing my method, suitable valves may be actuated in the proper sequence as to automatically divert the two fluids to separate storage vessels or distribution systems. This is done by adding a suitable reagent at the inlet to the pipeline when the first portion of the second fluid is introduced therein. The presence of this reagent is then qualitatively determined at the pipeline outlet and the appearance of the reagent coincides with the appearance of the first portion of the second fluid. This qualitative analysis is accomplished automatically, and may be utilized to actuate a signaling device to show when the second fluid first appears at the pipeline outlet, or the analyzing device may actuate a controller to operate valves in such fashion as to segregate the two fluids and direct them into separate storage vessels or distribution systems.

It is an object of the invention to provide an improved method of and apparatus for determining the boundary between two fluids of different composition which are successively introduced into a pipeline.

It is a further object to provide a method of and apparatus for diverting the two fluids into separate storage vessels or distribution systems.

It is a still further object to provide a signaling device to show the time at which the second fluid begins to appear at the pipeline outlet.

It is a still further object to provide a method and apparatus which is simple and reliable in operation, and which may be constructed at low cost.

Various other objects, advantages and features of the invention will become apparent from the following detailed description taken in conjunction with the accompanying drawing, in which the figure is a flow diagram of suitable apparatus for carrying out the method of my invention.

Referring now to the drawing in detail, a pipeline 10 is provided with pump and storage facilities 11 at its inlet end and with storage facilities 12 at its outlet end. The facilities at the pipeline inlet include storage tanks 13, 14 for holding fluids of different compositions, these fluids being selectively introduced to a pumping unit 15 by valved conduits 16 and 17, respectively. From the pumping unit, fluid passes through a conduit 18 to the pipeline inlet. In accordance with the invention, a container 19 is provided for supplying a suitable reagent to the pipeline inlet through a valved conduit 20. In operation, a preselected first fluid may be pumped from vessel 13 into the pipeline inlet.

After pumping of the desired quantity of the first fluid is completed, a quantity of the second fluid is introduced into the pipeline from storage vessel 14 and, simultaneously, a small quantity of reagent from container 19 is allowed to flow into the pipeline and intermingle with the second fluid. The presence of reagent in the pipeline outlet, therefore, indicates the presence of the second fluid. The reagent is preferably admixed only with the first portion of the second fluid since it is only necessary to locate the boundary between the two fluids in order to practice an important modification of my invention.

The equipment at the outlet of the pipeline includes storage vessels 22, 23 into which fluids from the pipeline are selectively introduced through conduits 24, 25 controlled, respectively, by automatic valves 26 and 27. A small sample stream is withdrawn from the pipeline, as desired, by valved conduit 28 and a reactant material is introduced into conduit 28 from a storage container 29 through a valved conduit 30. When the material sampled from the pipeline contains the reagent introduced to the pipeline inlet, a chemical reaction occurs between the latter material and the reactant introduced from container 29, thereby to produce a color change in the fluid passing through conduit 28. Preferably, mixing and reaction of the two materials takes place in the conduit 28. The reacted fluid is discharged into a vessel 31 where it is traversed by a beam of light which passes from a light source 33 through a peep hole assembly 34 in vessel 31 and, thence, through the fluid in the vessel and a peep hole assembly 35 to a photoelectric cell 36. Photoelectric current produced by the cell is amplified by a unit 37, and the amplified voltage actuates a controller 38 operatively connected to autamatic control valves 26 and 27. The voltage from amplifier 37 may also be fed, if desired, to a signaling device 39. The liquid discharged from vessel 31 may pass back to the pipeline through a valved conduit 40 and a pump 41 or, alternatively, it may be discharged to waste or other suitable disposal through a valved line 42.

The method of my invention will now be apparent to those skilled in the art. When the first fluid from storage vessel 13 is introduced into the pipeline and, thence, into sample conduit 28, no reaction occurs when material is added from reactant container 29. Hence, no color change occurs in the material fed to vessel 31 and, under these conditions, the quantity of light passing from source 33 to photoelectric cell 36 is so adjusted that signaling device 39 is de-energized and controller 38 maintains valve 26 in open position while valve 27 is in closed position. As a result, the first fluid is directed into storage tank 22 or to a suitable distribution system. When the supply of the first fluid is stopped and flow of the second fluid from vessel 14 is initiated, a quantity of reagent is simultaneously introduced from container 19 into the inlet end of the pipeline. When the mixture of second fluid and reagent passes into sample line 28 and is admixed with material from container 29, a color change occurs in the material fed to vessel 31 with the result that the amount of light passing from source 33 to photoelectric cell 36 is changed. As a result, signaling device 39 is actuated and controller 38 closes valve 26 and opens valve 27, thereby to direct the second fluid into storage vessel 23 or to a suitable distribution system, as desired. It will be apparent, therefore, that I have obtained the objects of my invention in that the first and second fluids passing through the pipeline are automatically diverted into separate storage vessels or distribution systems without requiring the services of a skilled technician to conduct physical tests of the materials passing through the pipeline. If desired, controller 38 may be eliminated whereupon signaling device 39 will indicate when the first portion of the second fluid reaches the pipeline outlet. The valves may then be suitably manipulated, even by an unskilled operator, to divert the two fluids into separate storage vessels.

In a preferred embodiment of the invention, two hydrocarbon liquids, such as gasoline and kerosene, are successively transported through the pipeline, it being assumed that the first fluid is gasoline and the second fluid is kerosene. When the first portion of kerosene is introduced into the line, acetylene is added from container 19, this acetylene being admixed with the first portions of kerosene passing through the pipeline. In this preferred embodiment, the reactant in vessel 29 may be cuprous chloride dissolved in monoethanolamine. This latter material has a blue color which changes to red upon reaction with acetylene, and the resulting color change is utilized, in the manner already described, to actuate photoelectric cell 36, amplifier 37, controller 38, and signaling device 39 to direct the gasoline and kerosene into separate vessels and to indicate the appearance of the first quantity of kerosene at the outlet of the pipeline. Other cuprous salts and other organic bases are suitable for detecting the presence of acetylene in the sample line. For example such cuprous salts as the chloride, fluoride, bromide, iodide, sulfite, salicylate, nitrate, or thiocyanate are suitable for carrying out my method, and these salts may be utilized with monoethanolamine, diethanolamine, pyridine, ethanol pyridines, and similar compounds without departing from the spirit and scope of the invention. Color changes other than from blue to red may be involved in these reactions but, in each case, a color change of sufficient magnitude is obtained as to operate the photoelectric cell sensing device to operate in the manner already explained. The concentration of the cuprous salt is not critical and may vary over wide limits, it being understood that water may be added to the solution in vessel 29 either to increase the fluidity of the material or for purposes of economy. The manner in which the acetylene is introduced may also be varied. In some cases, a very small quantity is continuously added to the second fluid as it is pumped into the pipeline. However, in order to conserve acetylene, the addition may be discontinued a relatively short interval after the second fluid is introduced. In most cases, the amount of acetylene added is so small, for example, one thousandth of one percent, that the product specifications for the liquid being pumped is not jeopardized. Moreover, expensive injection equipment is not required nor is an excessive raw material cost incurred for the acetylene. It is obvious, of course, that the hydrocarbon fluids to be transported need not necessarily be gasoline and kerosene but other hydrocarbons, such as propane, butane, or even gas oils may be used in practicing my invention.

As previously indicated, there is ordinarily a zone of relatively short length within the pipeline wherein there is a mixture of the two fluids successively transported through the pipeline. Accordingly, after pumping the first fluid to its storage vessel, as hereinbefore explained, the next portion may be pumped to a second storage tank wherein a mixture of the two fluids is accumulated and sent to a separation device, such as a fractionator. A predetermined time after this occurs, the material in the pipeline is substantially all pure second fluid and this fluid may then be pumped to a third storage tank in the usual manner. It is convenient, in this modification, to introduce the acetylene into the pipeline inlet for such a period that the acetylene zone corresponds in length with the zone of mixture which it is desired to pass into the second vessel for separation. In this embodiment, a suitable cycle switch may be utilized to operate the valves on the three tanks to successively direct the pipeline fluid to the first, second, and third storage vessels. Finally, it will be evident that liquid need not be passed continuously into sample line 28. That is to say, by intermittent opening of the valve in sample line 28, spot checks may be made to determine the presence of acetylene in the pipeline material or, alternatively, the sample line may be opened shortly before it is expected that the second fluid shall appear at the pipeline outlet.

In some cases the cuprous salt-organic base reagent from tank 29 will be insoluble in the liquid passing through the pipeline. In such a case the liquid phase containing the cuprous salt reagent may be separated from the transported liquid after suitable contact and passed to cell 31; or the level of the light beam in cell 31 may be adjusted to pass only through the phase containing the cuprous salt reagent.

While the invention has been described in connection with a present, preferred embodiment thereof, it is to be understood that this description is illustrative only and is not intended to limit the invention, the scope of which is defined by the appended claims.

I claim:

1. The process for controlling passage of fluids through a pipeline which comprises introducing a first fluid and a second fluid successively into the pipeline inlet, introducing a reagent with the first part of the second fluid, qualitatively determining the presence of said reagent at the pipeline outlet, and regulating the fluid flow in response to the determination of the presence of said reagent.

2. The process for controlling passage of fluids through a pipeline which comprises introducing a first fluid and a second fluid successively into the pipeline inlet, introducing a reagent with the first part of the second fluid, continuously analyzing fluid withdrawn from the pipeline outlet to determine qualitatively the presence of said reagent in said fluid, and regulating the fluid flow in response to the determination of the presence of said reagent.

3. The method of controlling the passage of fluids through a pipeline which comprises successively introducing a first fluid and a second fluid into the pipeline, introducing a reagent into the pipeline with the first portion of said second fluid, withdrawing a sample stream from the pipeline outlet, adding a second reagent to said sample stream to produce a color change therein when said first reagent is present in the sample stream, determining the color of said sample stream after addition of said second reagent, and regulating the fluid flow in response to the color of said sample stream.

4. A method in accordance with claim 3 in which the first reagent is acetylene and the second reagent is a solution of a cuprous salt in an organic base.

5. A method in accordance with claim 4 in which the cuprous salt is selected from the group consisting of cuprous chloride, cuprous fluoride, cuprous bromide, cuprous iodide, cuprous sulfide, cuprous salicylate, cuprous nitrate, and cuprous thiocyanate and the organic base is selected from the group consisting of monoethanolamine, diethanolamine, pyridine and ethanol pyridines.

6. A process in accordance with claim 5 in which the first and second fluids are gasoline and kerosene.

7. The method of controlling the passage of fluids through a pipeline which comprises successively introducing a first fluid and a second fluid into the pipeline, introducing a reagent into the pipeline with the first portion of said second fluid, withdrawing a sample stream from the pipeline outlet, adding a reagent to said sample stream to produce a color change therein when said first reagent is present in the sample stream, passing a beam of light through the sample stream containing said reagent, measuring the intensity of said light beam after passage through said sample stream, and regulating the fluid flow in response to said measured light beam intensity.

8. Apparatus for controlling the flow of fluids through a pipeline having an inlet section and an outlet section which comprises, in combination, a storage vessel, means for introducing a reagent from said storage vessel into the inlet section of said pipeline, a sample line communicating with the outlet section of said pipeline, a vessel for holding a second reagent which undergoes a color change upon reaction with said first reagent, means for introducing said second reagent into said sample line, a vessel for receiving the discharge from said sample line, a photoelectric cell adjacent said vessel, a source of light for passing a light beam through said vessel to said photoelectric cell, a plurality of storage tanks, a conduit connecting each storage tank to the outlet section of said pipeline, an automatic control valve in each conduit, and a controller actuated by said photoelectric cell to open one of said valves and close another of said valves responsive to a change in photoelectric current produced by a color change in said vessel.

9. The method of detecting the interface between two fluids passed through a pipeline which comprises successively introducing a first fluid and a second fluid into the pipeline, introducing a reagent into the pipeline with the first portion of said second fluid, withdrawing a sample stream from the pipeline outlet, adding a second reagent to said sample stream to produce a color change therein when said first reagent is present in the sample stream, and determining the color of said sample stream after addition of said second reagent.

10. A method in accordance with claim 3 in which the first reagent is acetylene and the second reagent is a solution of a cuprous salt in an organic base.

11. A method in accordance with claim 10 in which the cuprous salt is selected from the group consisting of cuprous chloride, cuprous fluoride, cuprous bromide, cuprous iodide, cuprous sulfide, cuprous salicylate, cuprous nitrate, and cuprous thiocyanate and the organic base is selected from the group consisting of monoethanolamine, diethanolamine, pyridine and ethanol pyridines.

GARDNER C. RAY.

References Cited in the file of this patent

UNITED STATES PATENTS

| Number | Name | Date |
|---|---|---|
| 1,471,342 | Logan | Oct. 23, 1923 |
| 2,047,985 | Weir | July 21, 1936 |
| 2,295,366 | Stout | Sept. 8, 1942 |
| 2,358,338 | Lilya | Sept. 9, 1944 |
| 2,392,620 | Sparks | Jan. 8, 1946 |